May 25, 1926. 1,585,762

C. P. CASS

AUTOMOTIVE BRAKE

Filed March 21, 1923

INVENTOR
CHRISTOPHER P. CASS
BY Wm. M. Cady
ATTORNEY

Patented May 25, 1926.

1,585,762

UNITED STATES PATENT OFFICE.

CHRISTOPHER P. CASS, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed March 21, 1923. Serial No. 626,671.

This invention relates to brakes, and more particularly to an automotive brake mechanism of the type employing a drum and expandible brake shoes for frictionally engaging the drum.

The principal object of my invention is to provide improved means for taking up slack due to the wear of the brake shoes on the brake drum.

Figure 1:
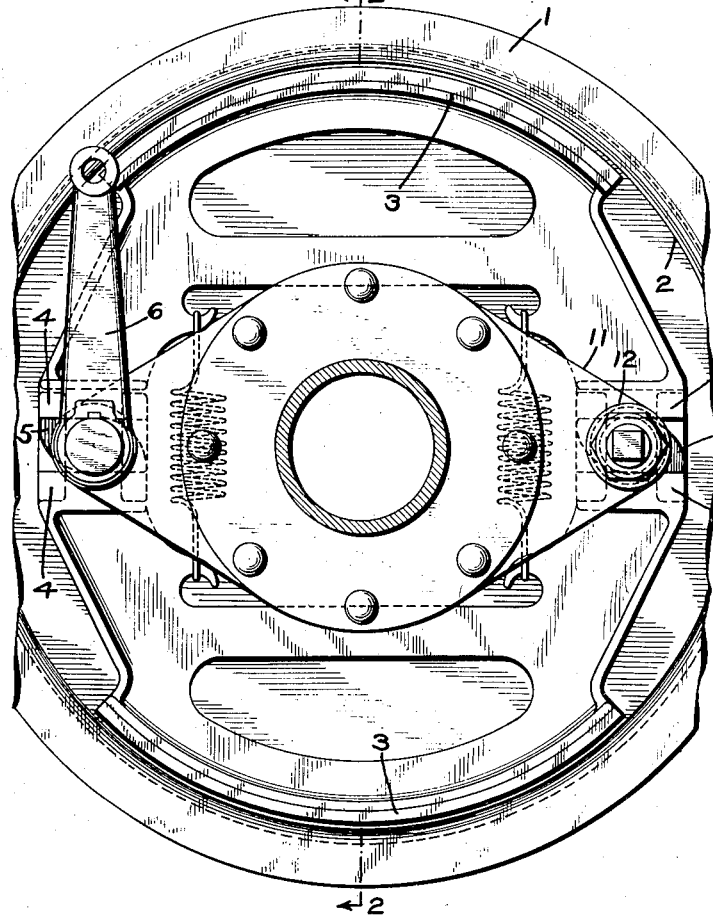
Figure 2:
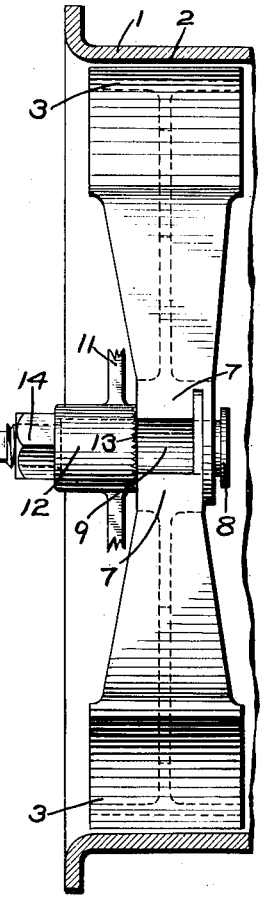
Figure 3:
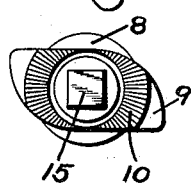
Figure 4:
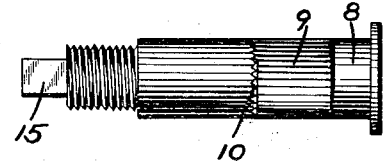

In the accompanying drawing; Fig. 1 is an elevational view of a drum and brake shoe mechanism, showing my improved slack adjuster applied thereto; Fig. 2 a section on the line 2—2 of Fig. 1; Fig. 3 an end view of the brake shoe hinge pin; and Fig. 4 an elevational view of the hinge pin.

As shown in the drawing, the brake mechanism may comprise a drum 1 having an interior annular friction face 2 and a pair of brake shoes 3 adapted upon expansion to frictionally engage the face 2. Interposed between the adjacent ends 4 of the brake shoes 3 is a cam 5 to which is connected an operating lever 6, so that by movement of the lever 6, the cam 5 may be rotated to spread the brake shoes into frictional engagement with the brake drum 1.

The other adjacent ends 7 of the brake shoes 3 are mounted on a hinge pin 8 which according to my invention is modified so as to provide means for taking up slack due to the wear of the brake shoes on the drum.

For the above purpose, the portion of the pin 8 which engages the ends 7 of the brake shoes 3 is made in the form of a double cam 9 and the inner face of said double cam 9 is provided with radial teeth 10.

A plate 11 secured to the axle housing is provided with a boss 12 which is apertured to receive the pin 8 and the adjacent face of the boss 12 is provided with teeth 13 adapted to engage the teeth 10 of the cam 9. A nut 14 has screw threaded engagement with the end portion of the pin 8, so that when the nut is screwed up, the teeth 10 of the cam 9 will engage the teeth 13 of the boss 12 and thus hold the pin in a fixed position against rotation.

In operation, when wear of the brake shoes on the brake drum is sufficient to require adjustment of the slack, the nut 14 is backed off so as to free the teeth 10 from engagement with the teeth 13 and the pin 8 is then rotated by applying a wrench to the squared end 15 of the pin, until the movement of the cam 9 has sufficiently spread the ends 7 of the brake shoes 3 so as to take up the slack. The nut 14 is then screwed down so as to cause the teeth 13 to interlock with the teeth 10 and thus secure the pin 9 and its cam portion 9 in the adjusted position. It will be evident that the above operation can be repeated by effecting a further rotation of the pin 8 whenever the wear of the brake shoes again produces slack.

Having now described my invention, what I claim as new and desire to secure by Letters Patent, is:—

1. The combination with a brake drum and brake shoes mounted in said drum, of a hinge pin interposed between adjacent ends of said brake shoes, a cam associated with said pin and adjustable by rotation of said pin to spread the brake shoes, teeth carried by said pin, and a stationary member provided with teeth adapted to interlock with the teeth on the pin to hold said pin in its adjusted position.

2. The combination with a brake drum and brake shoes mounted in said drum, of a hinge pin interposed between adjacent ends of said brake shoes, a cam associated with said pin and adjustable by rotation of said pin to spread the brake shoes, teeth carried by said pin, a stationary member provided with teeth adapted to engage with the teeth on the pin, and means for clamping said teeth in engagement, to hold said pin in its adjusted position.

In testimony whereof I have hereunto set my hand.

CHRISTOPHER P. CASS.